UNITED STATES PATENT OFFICE.

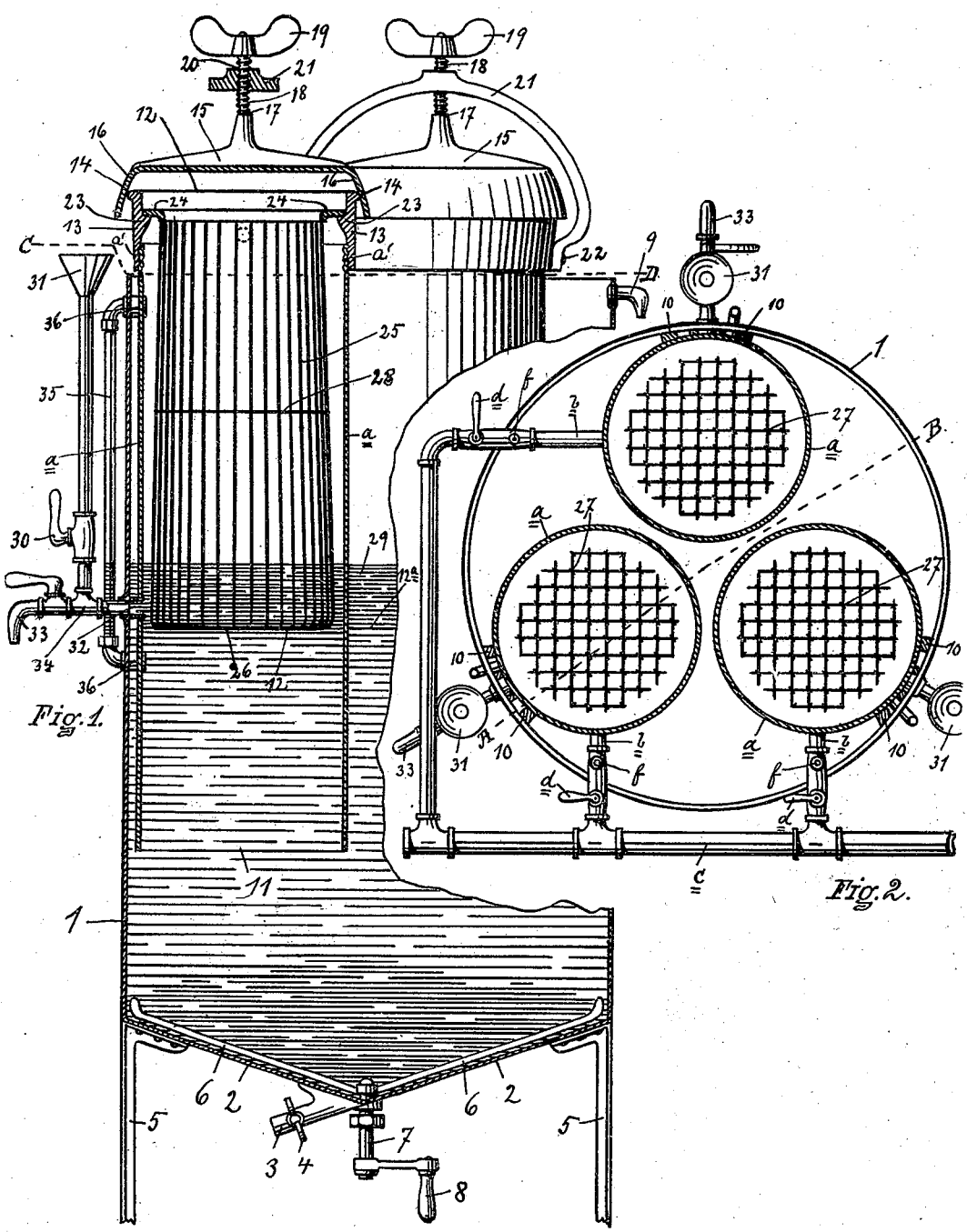

THOMAS W. MARSDEN, OF ILION, NEW YORK.

ACETYLENE-GAS GENERATOR.

SPECIFICATION forming part of Letters Patent No. 683,961, dated October 8, 1901.

Application filed December 22, 1899. Serial No. 741,337. (No model.)

*To all whom it may concern:*

Be it known that I, THOMAS W. MARSDEN, a citizen of the United States of America, and a resident of Ilion, Herkimer county, New York, have invented certain new and useful Improvements in Acetylene-Gas Generators, of which the following is a specification.

My invention relates to an acetylene-gas generator; and it consists in the mechanism hereinafter pointed out and claimed.

The object of my invention is to overcome the hitherto-established objections to the submerging, dipping, or spraying system of treating calcium carbids in the process of generating acetylene gas.

It is an established fact that there are more or less serious faults in the existing methods of submerging, dipping, or spraying calcium carbids in the manufacture of acetylene gas. The carbids contain a more or less quantity of foreign substances, which operate in a deleterious manner upon the gas generated. The after-development in either of the processes heretofore referred to is great, as more water is always taken up by the carbid when it is submerged, dipped, or sprayed than corresponds to the consumption either by capillary attraction or by the affinity of the carbid for the water. Another serious disadvantage in the treatment of the carbids heretofore referred to is the development of excessive heat, as in generating gas from the carbid under the processes already stated the carbid at the contact-point becomes sufficiently incandescent, (red-hot,) due to the accumulative development of heat in the mass, while the surrounding parts or remaining portions of the mass may not be above 115° to 125° Fahrenheit. The effect of the increase of heat is to interfere with the quality of the gas developed, as well as to increase the tendency to the stoppage of the pipes by an excessive development. These troubles are more particularly found in the submerging or dipping process, while in the generators using the spraying process the body of the carbid is sprayed, steam and gas are generated, and the whole surface undergoes more or less decomposition, and if the water runs on the carbid in a stream an excess of water is presented, and if there is insufficient water to decompose the entire mass of carbid, yet enough to cause a continuous after-development, a rise of temperature is inevitable.

The purpose of my invention is to minimize the troubles heretofore pointed out and to arrest the excessive development by means of a flux, preferably kerosene-oil, which has no affinity with the gases contained in the carbid and which acts, so to speak, as a "blanket" and follows the upper surface of the water, thereby arresting excessive development in the carbid above the water-line. By this process the water comes in contact with the carbid in the bottom of the crate in an inverted air-tight chamber located within the water-tank.

My invention has for its object the application of water with oil or other light substances which will float upon the water within the generator, which has an inverted chamber open at the bottom and gas-tight in its body and top.

Having described the general purposes of my invention, I will now proceed to describe the same with reference to the drawings, in which—

Figure 1 is a vertical section on line A B of Fig. 2, broken lines indicating parts removed. Fig. 2 is a horizontal section of my generator on line C D of Fig. 1.

Having described my invention with reference to the figures, I will now proceed to describe the same with reference to details of construction, in which similar numerals of reference refer to corresponding parts in both views.

Numeral 1 is a water-tank, circular in horizontal cross-section, open at the top, with an inverted conical-shaped bottom 2, provided with an outlet 3, controlled by stop-cock 4 and supported on legs 5. I provide the tank at the bottom with rotatable cleaning-fingers 6, rigidly secured to shaft 7, supporting crank-handle 8, by means of which when properly and suitably packed the cleaning-fingers 6 can be rotated in the bottom of the tank for loosening the sediment of lime and other non-soluble portions of the carbid which drop into the bottom of the tank in the process of developing gas. I provide at the top of water-tank 1 an overflow-pipe 9 for permitting the overflow of water when there is an excess of pressure. Inside of the water-tank, either on or adjacent to its wall, I mount one or more generating-tubes $a\,a\,a$. The generating-tubes in this instance are supported on the inside of the wall of the water-tank by rivets or bolts, (not shown,) which in this instance pass through the wall of the water-tank and the generating-tube, which are held in position by bolts or rivets, (not thought necessary to be shown,) and for admitting the circulation of water around the generating-tube I preferably interpose blocks or strips 10 10 10, with water-chambers between them running vertically between the inner wall of the water-tank and the outward wall of the generating-tube. The generating-tube is open at the bottom 11, Fig. 1, to admit the water, the top of which in the water-tank is at 12, Fig. 1. The body of the generating-tank is preferably made water and gas tight. The top of the generating-tanks extend above the top of the water-tank 1 and are each provided with a metal ring 13, secured to the wall of generating-tube $a$, as best illustrated in Fig. 1 at $a'$, the ring being held to the body of the generating-tube, so as to make a gas-tight joint. On the upper face of ring 13 I provide a curve projection 14, turned true for receiving cover 15, which is turned on a true circle on its inner face at 16, so that when placed over the projecting surface 14 of the ring it can be crowded down through the operation of the screw, so as to make a gas-tight joint. In the top of the cover I provide screw-socket 17, which receives screw 18, which is operated by handle 19, the screw engaging screw-thread opening 20 in bail 21, adjustably secured to the ring at 22. (Illustrated in Fig. 1.) By swinging into the position shown at the right of Fig. 1 and turning the screw down into contact with the cover it is forced down onto the true circle, thereby making a gas-tight joint without packing, except the ground or true contact surfaces between the ring and the cover. Inside of the metal ring 13 I provide projecting shoulder or lug 23 for supporting crate-ring 24.

In crate-ring 24 I insert a series of wires 25, rigidly secured at their top in the ring and depending in a vertical position and inclined or deflected outwardly at the bottom to prevent clogging of the carbids in the crate and at the lower extremity formed in flat surface 26 at the bottom of the crate, as illustrated in Fig. 1. By this arrangement a quantity of carbid is always presented to the action of the water in the bottom of the crate, and, if desirable, where the wires cross at the bottom, as illustrated in Fig. 2, the wires may be soldered or held together at intersections 27, and, if desired, they can be supported from bulging by supporting wire 28 between the extremities of the wire crate. By this arrangement the carbid will feed down to the bottom of the crate for the operation of the water without clogging. The encircling wire 28 can be soldered or otherwise secured to the outer side of the wires for preventing the carbid coming in contact, and thereby failing to feed down where the action of the water can operate upon the carbid. The carbid-crate is removable from the generating-tube by removing the cover and lifting the crate out, when the same can be charged with carbids and reinserted, or the carbids can be placed in the crate while in its position in the generating-tube by removing the cover. This, however, should not be done when the water-tank is filled or partially filled with water; but by drawing the water down it will not come in contact with the crate. The crate may be filled while hanging in position in the generating-tubes.

For arresting the excessive generation of gases and to protect the carbid in the crate from generating gas above the contact line with the water I insert between water-lines 12 in the generating-tube and top line $12^a$ a flux, which in this instance preferably consists of kerosene-oil, or any other oil or floating substance which will not decompose the carbid, may be used. I insert the kerosene-oil by opening cock 30 and by pouring the oil into funnel-opening 31, which allows the oil to pass into generating-tube through pipe-opening 32, so that the oil or floating flux is on top of the water in the generating-tube, as illustrated in Fig. 1. When a sufficient quantity of oil is inserted through this avenue, the stop-cock 30 is turned crosswise, so as to shut off the opening, and when it is desirable to recharge the carbid-crate or clean the water-tank the oil may be drawn out by turning stop-cock 33 into the position shown in Fig. 1, when the oil will pass through pipe 34 out into the receptacle, where it can be saved and reused; but when the oil is being inserted stop-cock 33 should be turned crosswise and outlet-pipe 34 closed. The quantity of oil or other floating flux which does not produce gas when in contact with the carbids may be inserted in more or less quantities in the generating-tube, even to the extent of filling it nearly to its top, without interfering with the operation of the generator. As the water is brought in contact with the bottom of the carbid-crate gas is generated within the generating-tube and passes up through the oil or floating flux into the upper part of the generating-tube, which performs the function in part of the gas-holder, and is admitted into gas-exit pipes $b\,b\,b$, which convey the gas into supply-pipe $c$, Fig. 2. Pipes $b\,b\,b$ are each controlled by stop-cock $d\,d\,d$, which will enable the operator to shut off in one of the generating-tubes, so that one or all of the generating-tubes may be operated at the will of the operator. After charging the crate with carbid and replacing the cover and getting the generating-tube in position for use more or less air necessarily will be found between the top of the crate, and to get rid of this partially gas and air combined, so that it will not be carried into supply-pipe c, I provide burners f f f, controlled by a key, and after charging the generating-tube with carbids in the crate I open the key to gas-burner f and burn out the air and gas from the upper portion of the generating-tube until the gas burns steadily, and then I close the key in burner f and the gas is then ready for use in the supply-pipe.

For determining the amount of oil or floating flux in the generating-tube I provide glass gage 35, which opens at 36 36 into the generating-tube, so that it will always indicate the height of flux and water or water in each generating-tube.

By locating the generating-tubes inside of the water-tank and using oil or floating flux in the generating-tube the heat is reduced to the minimum, as each generating-tube is inside of the water, where it forms a complete jacket surrounding each tube, and thereby making the parts entirely safe and free from an excessive generation of heat, and as the gas is generated it passes through the oil or floating flux inside of the generating-tube, thereby purifying the same, and as the pressure increases in the generating-tube the water and flux are both forced downward in the generating-tube, thereby driving the water out of contact with the carbid, when the carbid is instantly covered by the flux and decomposition arrested and the insoluble portions of the carbid remaining are freed from the bottom of the carbid-crate, the meshes of which are from one-half to one inch in the clear, thereby preventing the accumulation of lime and other non-gas-producing substances which are always present in the carbid when undergoing process of decomposition, so that the bottom of the carbid-crate which acts as the crate is always kept free, which is a point of great advantage in an acetylene-gas generator.

It will be readily understood that changes and modifications may be made in my invention without departing from its spirit or the beneficial purposes attained by its use.

What I claim as new, and desire to secure by Letters Patent, is—

1. In combination, a water-tank, several separated parallel generator-tubes secured to said tank and depending into the water therein, each tube having an open lower end and a top cover, gas-take-off pipes from the upper ends of said tubes, removable open-work carbid-crates in the tubes, each tube having a crate suspended from its top therein, pipes extending from the exterior of the tank into the generator-tubes, respectively, above the lower ends thereof, and provided with valves, for the introduction of an oil-flux into and the discharge thereof from any generator-tube, substantially as described.

2. In combination, a water-tank, a vertical generator-tube secured therein and having a lower open end sealed by the water in the tank, removable means for sealing the upper end of the tube, a gas-take-off pipe from the tube, a carbid-crate depending into the tube below the normal water-line therein, and a valved oil-supply pipe extending through the tank and tube to a point above the normal water-line for the introduction of oil into the generator-tube so that the oil floats on the water in the tube and coats the carbid preventing undue decomposition thereof and the water and oil rise and fall together, substantially as described.

3. In combination, a water-tank, a generator-tube supported therein with its lower open end sealed by the water therein, removable sealing means for the upper end of said tube, a carbid-crate in the tube projecting below the normal water-line, an oil-supply pipe from the exterior of the tank and opening into said tube, said pipe provided with a valved discharge for the withdrawal of oil in the tube, and with a vertical valved oil-supply funnel, substantially as described.

4. In combination, a water-tank, a generator-tube supported therein and having its open lower end sealed by the water therein and provided with top sealing means, a carbid-crate in the tube and depending below the normal water-line therein, an oil-supply pipe opening into said tube above the normal water-line therein, and the exterior oil-sight gage at its lower end opening into said tube below the lower end of said crate, and at its upper end opening into said tube above the water therein, substantially as described.

5. In an acetylene-gas-generating machine, the combination, of a water-tank, a generating-tank into which the water from the water-tank is free to flow, a carbid-holder supporting the carbid in the generator below the normal water-line in the generator, an oil-supply pipe extending from the exterior of the water-tank through the wall thereof and through the wall of said tube and opening into the interior of the tube to discharge oil into the generator above the water surrounding and partially inclosing the carbid above the water-line for partially arresting undue development of the carbid above the water-line, substantially as set forth for the purposes stated.

6. In combination, a water-tank having a closed bottom, several separate generator-tubes independently supported in said tank having lower open ends, independent means for sealing the top of each tube, carbid-crates supported in each tube, pipes for taking off the gas from said tubes, and independent oil-supply pipes opening from the exterior of the tank into each tube for discharging oil into any tube onto the water therein, substantially as described.

7. In combination, a water-tank, a generator-tube therein having an open lower end below the normal water-line of the tank, removable sealing means for the upper end of said tube, means to take off the gas from said tube, an open-work carbid-crate supported within the tube and projecting below the normal water-line therein, and a valved oil-supply to and oil-discharge from said tube from the exterior of the tank to a point within said tube above the normal water-line thereof, substantially as described.

Signed by me at Ilion, New York, this 18th day of December, 1899.

THOS. W. MARSDEN.

Witnesses:
   J. M. WILLIAMS,
   CARRIE E. JEPSON.